J. D. GARDNER.
RUNNING GEAR FOR VEHICLES.
APPLICATION FILED MAY 18, 1921.

1,406,000.

Patented Feb. 7, 1922.

Inventor-
John D. Gardner.
by E. D. Anderson
Attorneys.

UNITED STATES PATENT OFFICE.

JOHN D. GARDNER, OF GAINESVILLE, FLORIDA.

RUNNING GEAR FOR VEHICLES.

1,406,000.  Specification of Letters Patent.  Patented Feb. 7, 1922.

Application filed May 18, 1921. Serial No. 470,572.

*To all whom it may concern:*

Be it known that I, JOHN D. GARDNER, a citizen of the United States, resident of Gainesville, in the county of Alachua and State of Florida, have made a certain new and useful Invention in Running Gear for Vehicles; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
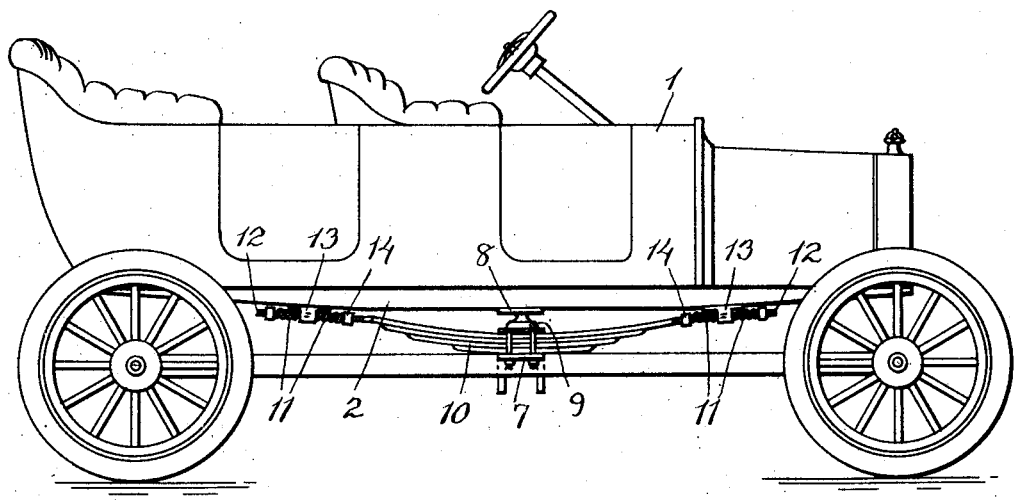
Figure 1 is a side view of the invention as applied.
Figure 2:
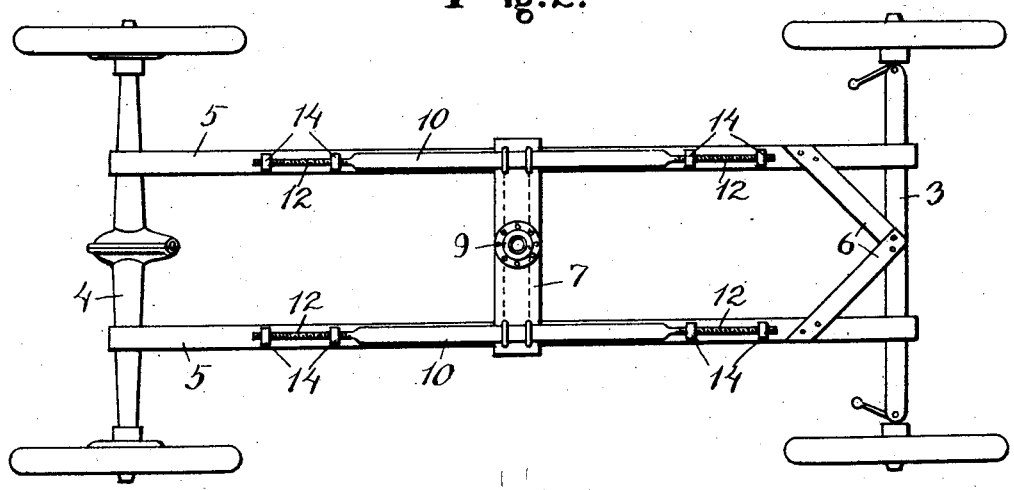
Figure 2 is a bottom plan view of the same.

The invention has relation to suspension means for vehicle bodies, having for its object the provision of such means wherein the springs will be relieved almost entirely of the weight of the body while retaining their full cushioning powers.

The invention consists in the novel construction and combinations of parts, as hereinafter set forth.

In the accompanying drawings, illustrating the invention, the numeral 1 designates the body or chassis of an automobile, supported upon the usual longitudinal frame members 2, and 3 and 4 designate respectively the usual front and rear axles. Connecting these axles and located directly beneath the frame members 2, lower frame bars 5 are provided. The running gear is completed by the provision of any desired stiffening members, such as the cross braces 6, and of a central plate 7, resting upon and spanning the frame bars 5. A corresponding plate 8 underlies and spans the frame members 2, being located immediately above the plate 7.

To the plates 7 and 8 are secured the two sections of a ball and socket joint 9, intended to be located centrally of the wheels and approximately at the center of gravity of the body 1, under normal loading conditions. Obviously, any preferred form of universal joint may be substituted for the ball and socket construction shown.

Springs are interposed between the running gear and the body 1, the frame construction above described lending itself particularly to the spring arrangement disclosed in the drawings, wherein lateral leaf springs 10 are shown, in combination with coil springs 11. The springs 10 are supported centrally upon the frame bars 5, to which they are clipped or otherwise suitably secured. The upper leaf of each spring has end extensions providing each a rod 12, threaded at each end and loosely engaging the perforation of a bracket 13, secured to the frame member 2. Two springs 11 surround each rod 12, bearing against opposite faces of the bracket 13 and against nuts 14, engaging the threaded portions of the rod. The tension of these springs may be adjusted as desired by means of the nuts 14.

The joint 9 sustains practically the entire weight of the body of the car, while the springs provide a yielding balance connection at four points of said body, equidistant from the joint.

I claim:

1. Suspension means for vehicle bodies, comprising a running gear having longitudinal frame bars connecting the axles, a cross plate resting upon said longitudinal bars, a universal joint mounted upon said cross plate and connected to said body approximately at the center of gravity, and yieldable connecting means between said running gear and said body, adapted to balance the body upon said universal joint.

2. Suspension means for vehicle bodies having longitudinal frame members, comprising a transverse plate underlying said frame members, a running gear having longitudinal frame bars connecting the axles, a cross plate resting upon said longitudinal bars, a universal joint mounted upon said cross plate and connected to said transverse plate approximately at the center of gravity of said body, and yieldable connecting means between said running gear and said body, adapted to balance the body upon said universal joint.

3. Suspension means for vehicle bodies having longitudinal frame members, comprising a transverse plate underlying said frame members, a running gear having longitudinal frame bars connecting the axles, a cross plate resting upon said longitudinal bars, a universal joint mounted upon said cross plate and connected to said transverse plate approximately at the center of gravity of said body, and yieldable connecting means between the frame bars of said running gear and the frame members of said body, adapted to balance the body upon said universal joint.

4. Suspension means for vehicle bodies having longitudinal frame members, comprising a transverse plate underlying said frame members, a running gear having longitudinal frame bars connecting the axles, a cross plate resting upon said longitudinal bars, a universal joint mounted upon said cross plate and connected to said transverse plate approximately at the center of gravity of said body, and yieldable connecting means between the central portions of the frame bars of said running gear and the distal portions of the frame members of said body, adapted to balance the body upon said universal joint.

5. Suspension means for vehicle bodies having longitudinal frame members, comprising a transverse plate underlying said frame members, a running gear having longitudinal frame bars connecting the axles, a cross plate resting upon said longitudinal bars, a universal joint mounted upon said cross plate and connected to said transverse plate approximately at the center of gravity of said body, and yieldable connecting means between said running gear and said body, comprising brackets attached to the frame members of said body at points equidistant from said universal joint, rods slidably engaging said brackets, opposed coil springs upon said rods resisting sliding movement thereof, and longitudinally disposed members connecting said rods with the frame bars of said running gear.

6. Suspension means for vehicle bodies having longitudinal frame members, comprising a transverse plate underlying said frame members, a running gear having longitudinal frame bars connecting the axles, a cross plate resting upon said longitudinal bars, a universal joint mounted upon said cross plate and connected to said transverse plate approximately at the center of gravity of said body, and yieldable connecting means between said running gear and said body, comprising brackets attached to the frame members of said body at points equidistant from said universal joint, rods slidably engaging said brackets, opposed coil springs upon said rods resisting sliding movement thereof, and longitudinally disposed leaf springs centrally secured upon the frame bars of said running gear and having terminal connections with said rods.

In testimony whereof I affix my signature in presence of two witnesses.

JOHN D. GARDNER.

Witnesses:
B. A. THRASHER,
J. H. TURBEVILLE.